(No Model.)

J. BEECHER & T. P. SMART.
JACK.

No. 311,716. Patented Feb. 3, 1885.

Witnesses
John M. Clayton
James J. Tobin

Inventors
James Beecher
and
Terrence P. Smart
by their Attorneys
Howson & Sons

UNITED STATES PATENT OFFICE.

JAMES BEECHER AND TERRENCE P. SMART, OF PHILADELPHIA, PA.

JACK.

SPECIFICATION forming part of Letters Patent No. 311,716, dated February 3, 1885.

Application filed August 7, 1884. (No model.)

*To all whom it may concern:*

Be it known that we, JAMES BEECHER and TERRENCE P. SMART, citizens of the United States, residing in Philadelphia, Pennsylvania, have invented certain Improvements in Jacks, of which the following is a specification.

Our invention consists of a jack intended, principally, for bracing the plank linings of sewer-trenches and like excavations, the main object of our invention being to protect the threaded portions of the jack from injury and to prevent the clogging of the same by the access thereto of earth or other foreign matters.

Figure 1:
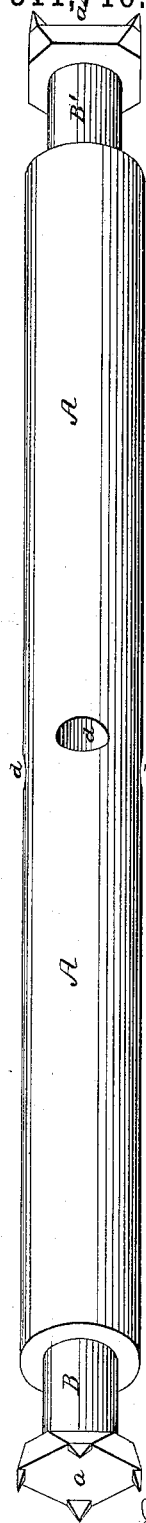
Figure 2:
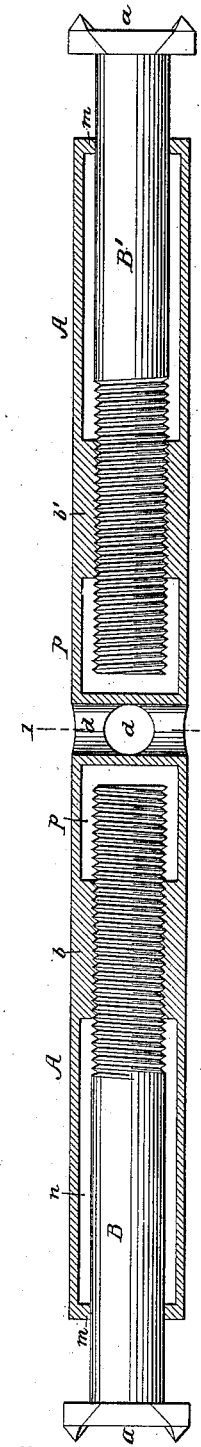
Figure 3:
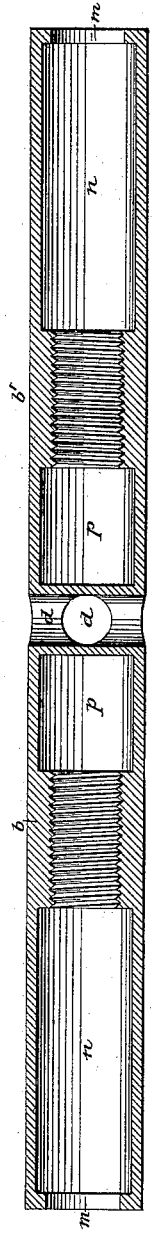
Figure 4:
Figure 5:
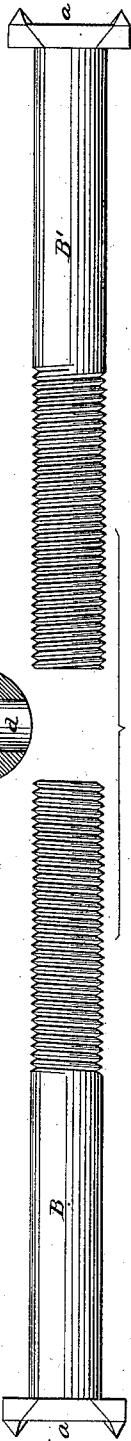

In the accompanying drawings, Figure 1 is a perspective view of our improved jack; Fig. 2, a longitudinal section of the same with the thrust-rods in elevation; Fig. 3, a longitudinal section of the central tube; Fig. 4, a transverse section of the same on the line 1 2, Fig. 2; and Fig. 5, a side view of the thrust-rods detached from the tube.

The jack consists of a central tube, A, and two thrust-rods, B B', each of which is provided at the outer end with a claw-plate, $a$, and is threaded at the inner end for adaptation to a nut in the tube A, the rod B and its nut $b$ having a left-hand thread, and the thread of the rod B' and its nut $b'$ being right-handed, as shown, so that when the claw-plates are pressed against the planks on opposite sides of the trench, and the rods thereby prevented from turning, the rotation of the tube in one direction will cause the rods to be thrust outward, so as to brace the planks, the rods being retracted on turning the tube in the opposite direction. The outer ends, $m$, of the tube A fit snugly to the unthreaded portions of the rods B B', so as to prevent the access of dirt or other foreign matter to the threads, and between said ends and the nuts $b$ $b'$ the tube is chambered internally, as shown at $n$ $n$, so as to lessen its weight and reduce the friction on the rods. The tube is also chambered at $p$ $p$ between the nuts $b$ $b'$, and the center of the tube is preferably provided with transverse openings $d$ for the reception of a bar, whereby the tube can be readily turned, the openings being incased, as shown, so that no dirt can through them gain access to the threaded portions of the tube or rods.

Instead of forming transverse openings in the tube, the latter may have one or more shallow depressions for the reception of the pin of a spanner; or it may be made square or hexagonal for the use of an ordinary wrench, the openings, however, being preferred.

The tube A presents a straight surface, so that when used in the bottom of the trench it will not interfere with the proper support of a platform such as is ordinarily used in constructing sewers and like underground conduits.

We claim as our invention—

1. The combination of the threaded thrust-rods B B' with the tube A, having internal nuts, $b$ $b'$, and ends $m$, which fit snugly to the unthreaded portions of the rods, as set forth.

2. The combination of the threaded thrust-rods B B' with the tube A, having internal nuts, $b$ $b'$, chambered portions $n$ $n$, and ends $m$ $m$, which fit snugly to the unthreaded portions of the rods, as specified.

3. The combination of the threaded rods B B' with the tube A, having internal nuts, $b$ $b'$, and incased transverse openings $d$, as set forth.

In testimony whereof we have signed our names to this specification in the presence of two subscribing witnesses.

JAMES BEECHER.
TERRENCE P. SMART.

Witnesses:
HARRY SMITH,
HENRY HOWSON, Jr.